Oct. 22, 1929.  M. KOHL ET AL  1,732,725
GREASING DEVICE
Filed Feb. 6, 1928   2 Sheets-Sheet 1

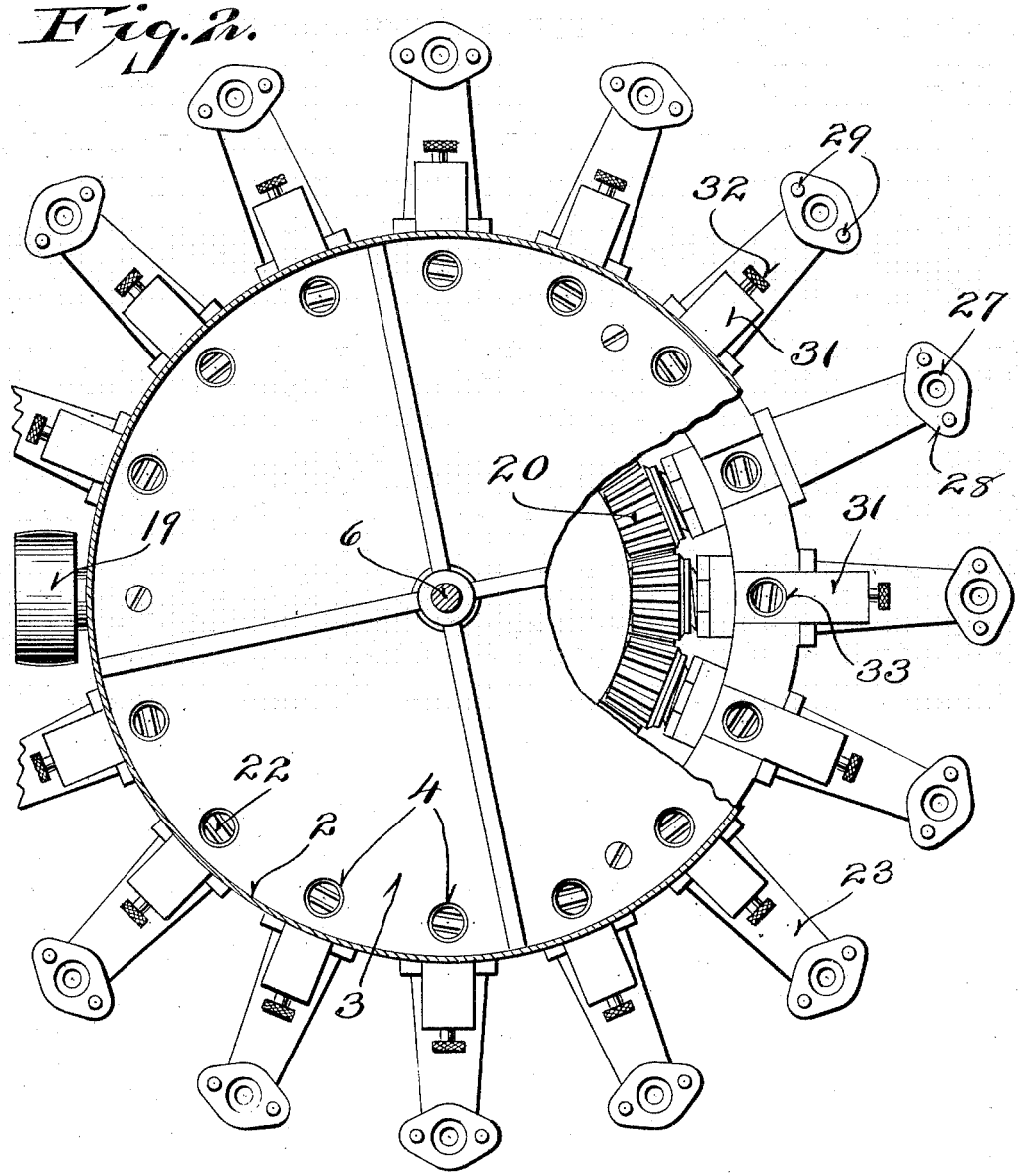

Patented Oct. 22, 1929

1,732,725

UNITED STATES PATENT OFFICE

MICHAEL KOHL AND LUDWIG STEMMELER, OF NORTH MILWAUKEE, WISCONSIN; SAID STEMMELER ASSIGNOR TO JOSEPH BLINKMOELLER, OF MILWAUKEE, WISCONSIN

GREASING DEVICE

Application filed February 6, 1928. Serial No. 252,340.

This invention relates to greasing devices.

Objects of this invention are to provide a novel form of greasing device which is adapted for use in connection with large machines having a plurality of bearings which need frequent greasing, and further objects of the invention are to so construct the greasing device that it will simultaneously supply grease to a plurality of independent and spaced bearings in a predetermined amount.

Further objects of this invention are to provide a novel form of greasing machine which is so constructed that the grease may be dumped into a central chamber with the utmost ease and the chamber may thereafter supply a plurality of feed units which pass grease to the several bearings.

Further objects are to provide a power driven greasing device of very simple construction, which is easily produced by ordinary machine shop methods, and in which provision is made for independently cutting off one or more of the grease supplying units, and in which further provision is made for taking up any wear that may occur in the apparatus.

An embodiment of the invention is shown in the accompanying drawings, in which:

Figure 2 is a transverse sectional view with parts broken away.

Figure 1:
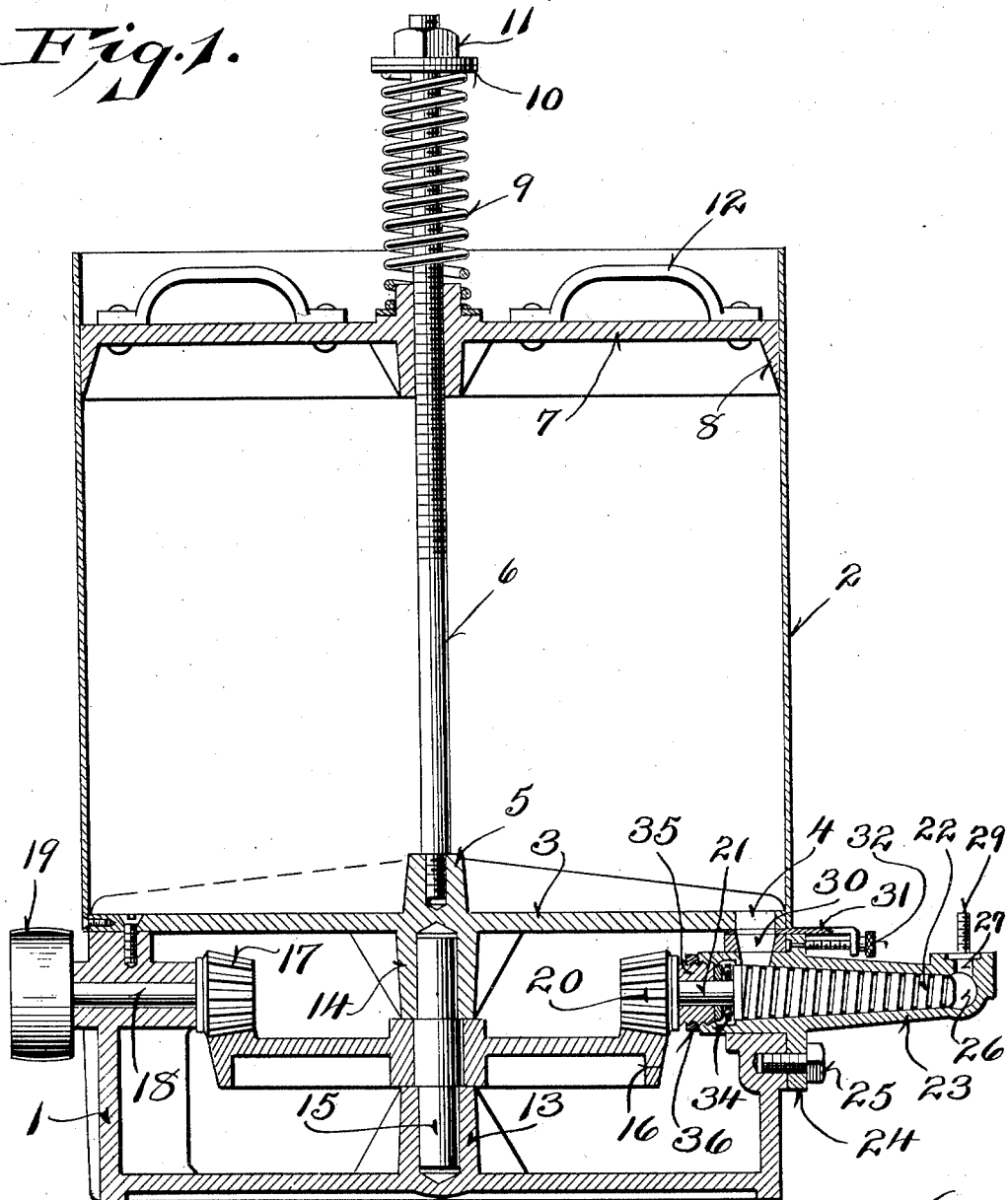
Figure 1 is a vertical sectional view through the device.

Referring to the drawings it will be seen that the device comprises a body portion or main base portion 1, which carries an upper grease receptacle or hopper 2 which is adapted to receive the entire supply of grease. The bottom member is closed by means of a plate 3 having a plurality of spaced apertures 4 alining with the apertures in the grease supplying units hereinafter described in greater detail.

The plate 3 closes the upper portion of the base or body portion 1, as will be seen from Figure 1, and constitutes the bottom of the grease receptacle 2 which carries a projecting boss 5 which is internally threaded and receives the bottom end of the stem 6. The stem loosely guides a top plate or cover 7 which is provided with a downwardly extending chisel-like flange adapted to be engaged by the side walls of the receptacle 2 as it travels downwardly and to thus scrape the grease clear from the sides of the receptacle. If desired, the cover or top plate 7 may be made sufficiently heavy to apply the requisite pressure to the grease to insure its smooth and easy feeding downwardly through the apertures 4 in the bottom plate.

Further, if desired, the plate 7 may be pressed downwardly by means of a spring 9 loosely coiled about the upper threaded end of the rod 6 and bearing at its bottom end against the plate and at its upper end against the washer 10 controlled as to position by means of the nut 11. Obviously, as the grease supply is used up the nut 11 is screwed down to maintain the pressure of the spring 9. Suitable handles 12 may be secured to the plate 7 to permit its ready removal for refilling.

The body portion of the device is provided with a centrally disposed bearing 13 and the bottom plate 3 of the receptacle, which is also the closure plate for the body portion 1, is similarly provided with a vertical, downwardly extending bearing 14. These bearings carry a vertical shaft 15 which in turn carries the large bevel gear 16. This bevelled gear is driven by means of a bevel pinion 17 carried by a short horizontal stub shaft 18 driven in any suitable manner, as by means of the pulley 19.

Thus, when the pulley is driven the gear 16 is rotated. The gear 16 also meshes with a plurality of regularly and evenly disposed bevel pinions which are rigidly connected to short shafts 21 (see Figure 1) such short shafts in turn being rigidly connected or integrally formed with the conical spiral feed members 22. These conical spiral feed members, or conical screws are provided with flat-faced threads which fit within a similarly contoured conical casing 23 provided with flanges 24 by means of which it may be secured, as by bolts 25, to the body portion 1.

The outer end of each of the casings 23 of the feeding units is provided with a delivery recess 26 into which grease is forced, and with an outlet 27 through which the grease passes. These outlet apertures 27 are surrounded by flanges 28, provided wth bolts, as indicated at 29 in Figure 1, so that similar flanges of pipes, or couplings, may be secured thereto. These pipes of course are adapted to lead to the various bearings of the machine which is to be greased.

It is to be noted that a throat or entrance aperture 30 alines with the aperture 4 for each of the grease feeding units. The apertures 4 may be closed off from communication with the apertures 30 by means of the slide plates 31 which are suitably guided and which are controlled as to position by means of the thumb screw 32 (see Figure 1). These plates 31 are apertured, as shown in Figure 2, and indicated by the reference character 33. Normally these apertures register with the apertures 4 and 30 and communication is thus established. However, if it is desired to cut off any of the feeding units, it is merely necessary to rotate the thumb screw 32 in the proper direction to thus slide the plate 31 inwardly and cut the feeding unit off from the rest of the apparatus.

The end of the feeding screw 22 of each unit bears against a ball bearing 34 (see Figure 1) which in turn is forced outwardly by means of the threaded bearing 35. This bearing 35 is screwthreaded into the inner end of the casing 23 and is locked by means of the ring-like nut 36. As wear occurs between the conically threaded member 22 and the casing 23, suitable adjustment may be made to compensate therefor by properly adjusting the threaded bearing collar 35. Thus it is possible to maintain a tight working fit between the interior of the casing 23 and the conical screw fed members 22 at all times.

In operation the grease is dumped into the container 2 and the cover plate 7 positioned. Thereafter the spring 9 is slipped on to the rod 6, the washers 10 are placed thereon and the nut 11 screwed down to suitably compress the spring 9. When it is desired to grease the machine, power is supplied the apparatus through the medium of the pulley 19. This causes rotation of the main gear 16 which simultaneously rotates all of the bevel pinions 20 and consequently operates all of the feeding units. Thus, all of the bearings of the machine supplied by the device are simultaneously furnished grease by the single power supply means.

It will be seen that a very simple and serviceable type of multiple bearing greasing device has been provided by this invention, which is easy to construct, and which may be quickly operated to grease all of the bearings of the machine supplied by the greasing device.

It will also be seen that the parts of this greasing device are sturdy and rugged and are not easily damaged. Further, the device is entirely self-contained and is substantially fool-proof.

Although the invention has been described in considerable detail, such description is intended as illustrative rather than limiting as the invention may be variously embodied and as the scope of such invention is to be determined as claimed.

We claim:—

1. A greasing device for supplying grease at a plurality of different points, said device comprising a body portion, a bevel gear mounted within said body portion, a plurality of projecting casings extending from said body portion and having conical hollow interiors, a plurality of screw feeding means of conical contour fitting within said casings, a bevel gear connected to each of said screw feeding means and meshing with said first mentioned bevel gear, means for driving said first mentioned bevel gear to simultaneously operate all of said screw feeding means, the casings for said screw feeding means having entrance and outlet apertures, a main container having a bottom plate provided with apertures alining with the entrance apertures of said casings, and a cover plate adapted to compress the grease within said main casing, and cause feeding of the grease through the apertures in the bottom plate 2. A greasing device for supplying grease at a plurality of different points, said device comprising a body portion, a bevel gear mounted within said body portion, a plurality of projecting casings extending from said body portion and having conical hollow interiors, a plurality of screw feeding means of conical contour fitting with said casings, a bevel gear connected to each of said screw feeding means and meshing with said first mentioned bevel gear, means for driving said first mentioned bevel gear to simultaneously operate all of said screw feeding means, the casings for said screw feeding means having entrance and outlet apertures, a main container having a bottom plate provided with apertures alining with the entrance apertures of said casings, and a cover plate adapted to compress the grease within said main casing and cause feeding of the grease through the apertures in the bottom plate, and a plurality of cutoff slides for independently closing any of the apertures through said bottom plate 3. A grease feeding device for supplying grease at a plurality of spaced points, said device comprising a body portion consisting of a casing, a plurality of casings projecting radially from said first mentioned casing and having conical interiors, said casings having an inlet aperture communicating with the larger end of the conical interior and having an outlet aperture communicating with the smaller end of the conical interior, a conical grease feeding member positioned within each of said casings, said grease feeding member having an inwardly projecting shaft, a bevel pinion carried by each of said inwardly projecting shafts a main bevel gear carried within said first mentioned casing and meshing with each of said bevel pinions, a driving pinion meshing with said gear, means for supplying power to said driving pinion, a grease container mounted above said first mentioned casing and having a bottom plate provided with apertures normally communicating with the inlet apertures of said casings, a plurality of slides adapted to interrupt communication between the apertures in said plate and the inlet apertures of said radial casings, and means carried by said grease container for bearing against the upper portion of the grease to aid in forcing the grease through the apertures in said plate.

4. A grease supply device, comprising a container for grease, a plurality of casings mounted below and communicating with said container, and extending radially outwardly therefrom, grease feeding screws in each of said casings, a bevel pinion rigidly joined to the inner end of each grease feeding screw, a bevel gear mounted below said container and meshing with each of said bevel pinions, means for driving said bevel gear, thereby simultaneously driving each of said bevel pinions, and means connected to the outer end of each of said radially extending casings to conduct grease under pressure from said casings.

In testimony that we claim the foregoing we have hereunto set our hands at Milwaukee, in the county of Milwaukee and State of Wisconsin.

MICHAEL KOHL.
LUDWIG STEMMELER.